United States Patent [19]
Panhard

[11] 3,732,943
[45] May 15, 1973

[54] AUTOMOBILE VEHICLES DRIVEN BY A ROTARY PISTON ENGINE

[75] Inventor: Jean Panhard, Paris, France

[73] Assignee: Societe de Constructions Mecaniques Panhard & Levassor, Paris, France

[22] Filed: Feb. 23, 1971

[21] Appl. No.: 117,949

[30] Foreign Application Priority Data

Feb. 24, 1970 France..............................7006563

[52] U.S. Cl.......................180/55, 180/43 R, 180/49
[51] Int. Cl..............................B60k 5/02, B60k 5/04
[58] Field of Search.....................180/54 F, 54 R, 42, 180/43, 44, 49, 55, 56, 60, 61, 62, 66 R; 418/61; 123/8.45

[56] References Cited

UNITED STATES PATENTS

| | | |
|---|---|---|
| 1,891,927 | 12/1932 | Hall.......................................180/49 |
| 3,125,996 | 3/1964 | Hoschele............................123/8.45 |
| 2,614,391 | 10/1952 | Pavlecka............................180/55 X |
| 2,894,593 | 7/1959 | Waterman..............................180/56 |

Primary Examiner—Benjamin Hersh
Assistant Examiner—Milton L. Smith
Attorney—Waters, Roditi, Schwartz & Nissen

[57] ABSTRACT

An engine has at least one rotary piston and a hollow rectilinear output shaft. The vehicle wheels are driven by two coaxially aligned transmission shafts coupled to the output shaft through a variable ratio transmission mechanism. One transmission shaft is coaxially inside the output shaft which it entirely traverses. Viewed axially, there are seen successively, the projecting portion of the transmission shaft, the engine, the transmission mechanism and the projecting portion of the second transmission shaft. The arrangement reduces the bulk of the propulsion unit group to that of the engine itself. Preferably a differential and a torque converter are included in the transmission mechanism.

9 Claims, 2 Drawing Figures

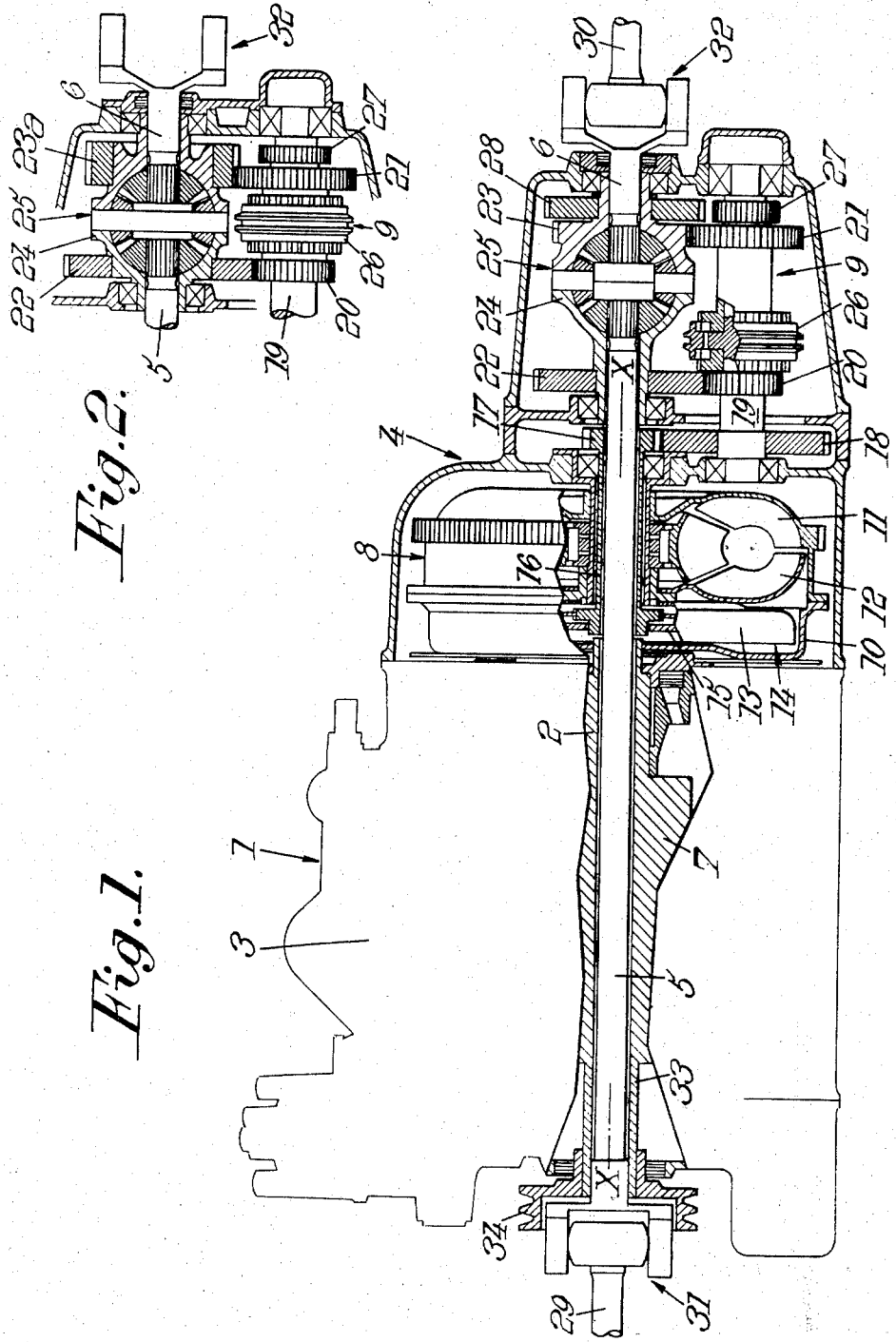

AUTOMOBILE VEHICLES DRIVEN BY A ROTARY PISTON ENGINE

The present invention relates to automobile vehicles driven by an engine with at least one rotary piston and with a hollow rectilinear output shaft with a fixed axis with respect to the casing of the engine, through a variable ratio transmission mechanism coupled to the engine and connecting the output shaft to two coaxially aligned transmission shafts which drive respectively two wheels or two groups of wheels of the vehicle, the assembly of the engine, of the transmission mechanism and of the transmission shafts constituting a propulsion unit group.

In constructions produced or contemplated hitherto, the transmission mechanism is arranged to offset the transmission shafts transversely with respect to the output shaft so that the transverse bulk of the engine is increased over that of the transmission shaft which runs along it.

It is an object of the invention to reduce the bulk and to facilitate the mounting of the propulsion unit in the above-indicated vehicles.

To this end, the automobile vehicle according to the invention is characterized by the fact that one of the transmission shafts is arranged coaxially inside the hollow output shaft through which it extends from one end to the other so that there is to be seen successively, in the axial direction, the projecting portion of this transmission shaft, the engine, the transmission mechanism and the projecting portion of the second transmission shaft.

It is clear that the transverse bulk of the propulsion unit is thus limited to that of the engine itself, which facilitates the mounting of the unit on a vehicle.

Preferably, a differential is inserted between the two transmission shafts and incorporated with the variable ratio transmission mechanism.

Preferably also, the transmission mechanism comprises a torque converter traversed coaxially by the first abovesaid transmission shaft as well as possibly a cutout clutch of which the drive element is rigidly fixed to the turbine of the torque converter.

In a first embodiment, the propulsion unit is arranged transversely with respect to the vehicle, the transmission shafts being coupled respectively to the wheels of the same axle of the vehicle. In a second embodiment, the propulsion unit is arranged longitudinally with respect to the vehicle, the transmission shafts being coupled respectively to at least two axles of the vehicle.

The invention will in any case be more fully understood, with the aid of the supplementary description which follows and of the accompanying drawing, which supplement and drawing relate to two preferred embodiments of automobile vehicles according to the invention, given purely by way of illustrative and non-limiting example.

In the drawings:

FIG. 1 shows diagrammatically, with parts in elevation and parts in axial section one embodiment of a propulsion unit of an automobile vehicle, constructed according to the invention; and FIG. 2 shows those of the elements of the propulsion unit of the automobile vehicle constructed according to another embodiment, which differ from those of the embodiment of FIG. 1.

The vehicle (not shown) is driven by an engine 1 with at least one rotary piston (not shown) and with a hollow output shaft 2 of axis X—X fixed with respect to the casing 3 of the engine, through a variable ratio transmission mechanism 4 coupled to the engine and connecting this output shaft 2 to two coaxially aligned transmission shafts 5 and 6 which drive respectively two wheels or groups of wheels (not shown) of the vehicle. The engine is advantageously a birotor rotary engine of the trochoidal type, the eccentrics 7 of the shaft 2 being driven in conventional manner by pistons.

According to the invention, the transmission shaft 5 is arranged coaxially inside the hollow output shaft 2 which it traverses from end to end, so that there is to be seen successively in axial direction (from left to right in FIG. 1) the projecting portion of this shaft 5, the engine 1, the transmission mechanism 4 and the projecting portion of the shaft 6.

The mechanism 4 comprises a torque converter 8 and a gear box 9, with at least one forward speed ratio and one reverse speed ratio. In the example described, the box has two forward speed ratios and one reverse speed ratio. Shaft 2 drives, through the casing 10 of the converter 8, the impeller element 11 of the latter of which the turbine element 12 is rigidly fixed to the drive element 13 of a conventional cut-off clutch 14. The driven element 15 of this clutch is keyed to slide on a hollow shaft 16 which is arranged around shaft 5, passes through the converter 8 and engages, through a pinion 17, a pinion 18 keyed on a primary shaft 19 belonging to the speed gear box 9, the pinions 17 and 18 forming a reducing couple. Two pinions 20 and 21 are mounted rotatably on the shaft 19 and are always in engagement respectively with the pinions 22 and 23 (FIG. 1) or 23a (FIG. 2) keyed on the casing 24 of the differential 25. A dog clutch means 26, preferably of the synchronizer type, enables one or other of the pinions 20 and 21 to be keyed on the shaft 19. A reverse speed pinion 27, keyed on the shaft 19, drives, through a sliding pinion not shown, a pinion, rigidly fixed to the casing 24 of the differential 25, which is either a pinion 28 from the neighboring forward speed pinion 23 (FIG. 1), or this same forward speed pinion 23a (FIG. 2).

The transmission shafts 5 and 6, driven in conventional manner by the differential 25, engage the wheel shafts 29 and 30, belonging to a same axle, through sliding couplings 31 and 32 enabling play for the suspension of the vehicle, the couplings being possibly single cardan joints.

On the other side of the shaft 2, the engine 1 can have another hollow shaft 33, also traversed by the transmission shaft 5, to actuate auxiliary devices (ventilator, oil pump for example) through a pulley 34 or gear wheel.

In the case where, as is stated above, the transmission shafts 5 and 6 drive the wheel shafts 29 and 30 belonging to a same axle, the propulsion unit constituted by the engine 1, by the transmission mechanism 4 with its clutch 14 and by transmission shafts 5 and 6 is arranged transversely with respect to the vehicle.

In a modification, the propulsion unit is arranged longitudinally with respect to the vehicle, the transmission shafts 5 and 6 being coupled respectively to at least two axles of the vehicle (for example shaft 5 to the front axle and the shaft 6 to the rear axle or to two rear axles).

There is thus obtained a propulsion unit for an automobile vehicle of which the operation emerges from the preceding description and of which the advantages are as follows, with respect to the known solution where the transmission shafts are offset transversely with respect to the output shaft of the engine:

smaller transverse bulk of the propulsion unit;
possibility of positioning this propulsion unit on a front wheel drive vehicle under a lower hood;
shortening of the vehicle for the same passenger capacity;
and mechanical simplification.

As is self-evident and as emerges already from the preceding description, the invention is in no way limited to those of its types of application, nor to those embodiments of its various parts, which have been more especially indicated; it encompasses, on the contrary, all modifications.

I claim:

1. A propulsion unit for an automobile vehicle comprising an engine having at least one rotary piston and a hollow rectilinear output shaft having a fixed axis with respect to the engine casing, and having a variable ratio transmission mechanism coupled to the engine and connecting the engine output shaft to two coaxially aligned transmission shafts which drive respectively two wheels or groups of wheels of the vehicle, the improvement wherein one of the transmission shafts is arranged coaxially within and traverses the hollow output shaft from one end to the other, the arrangement being in the axial sequence of: a projecting portion of said one transmission shaft, the engine, the transmission mechanism and a projecting portion of the other transmission shaft, a differential being inserted between the two transmission shafts and incorporated in the variable ratio transmission mechanism, and said transmission mechanism comprising a gear box with at least one forward speed ratio and one reverse speed ratio, the output pinions of the different ratios of the gear box being rigidly fixed to the differential casing.

2. A propulsion unit according to claim 1, wherein the transmission mechanism comprises a torque converter traversed coaxially by said one transmission shaft.

3. A propulsion unit according to claim 2, wherein the transmission mechanism comprises a cut-off clutch whose drive element is rigidly fixed to the turbine of the torque converter.

4. A propulsion unit according to claim 1, wherein the primary shaft of the gear box is offset with respect to the axis common to the output shaft and to the transmission shafts and is driven by a pair of reducing gears.

5. A propulsion unit according to claim 4, wherein the casing of the differential bears a pinion with which engage simultaneously a forward speed pinion, mounted rotatably on the primary shaft of the gear box, and a return pinion itself engaging with a reverse speed pinion mounted on the said primary shaft.

6. Automobile vehicle comprising a propulsion unit according to claim 1, said unit being arranged transversely with respect to the vehicle, the transmission shafts being coupled respectively to the wheels of a same axle of the vehicle.

7. Automobile vehicle comprising a propulsion unit according to claim 1, wherein the propulsion unit is arranged longitudinally with respect to the vehicle, the transmission shafts being coupled respectively to at least two wheel axles of the vehicle.

8. Automobile vehicle comprising a propulsion unit according to claim 1, wherein the propulsion unit is arranged transversely with respect to the vehicle, the transmission shafts being coupled respectively to coaxial wheel axles of the vehicle.

9. A propulsion unit according to claim 3, wherein said clutch is of the synchronizer type.

* * * * *